Patented May 18, 1937

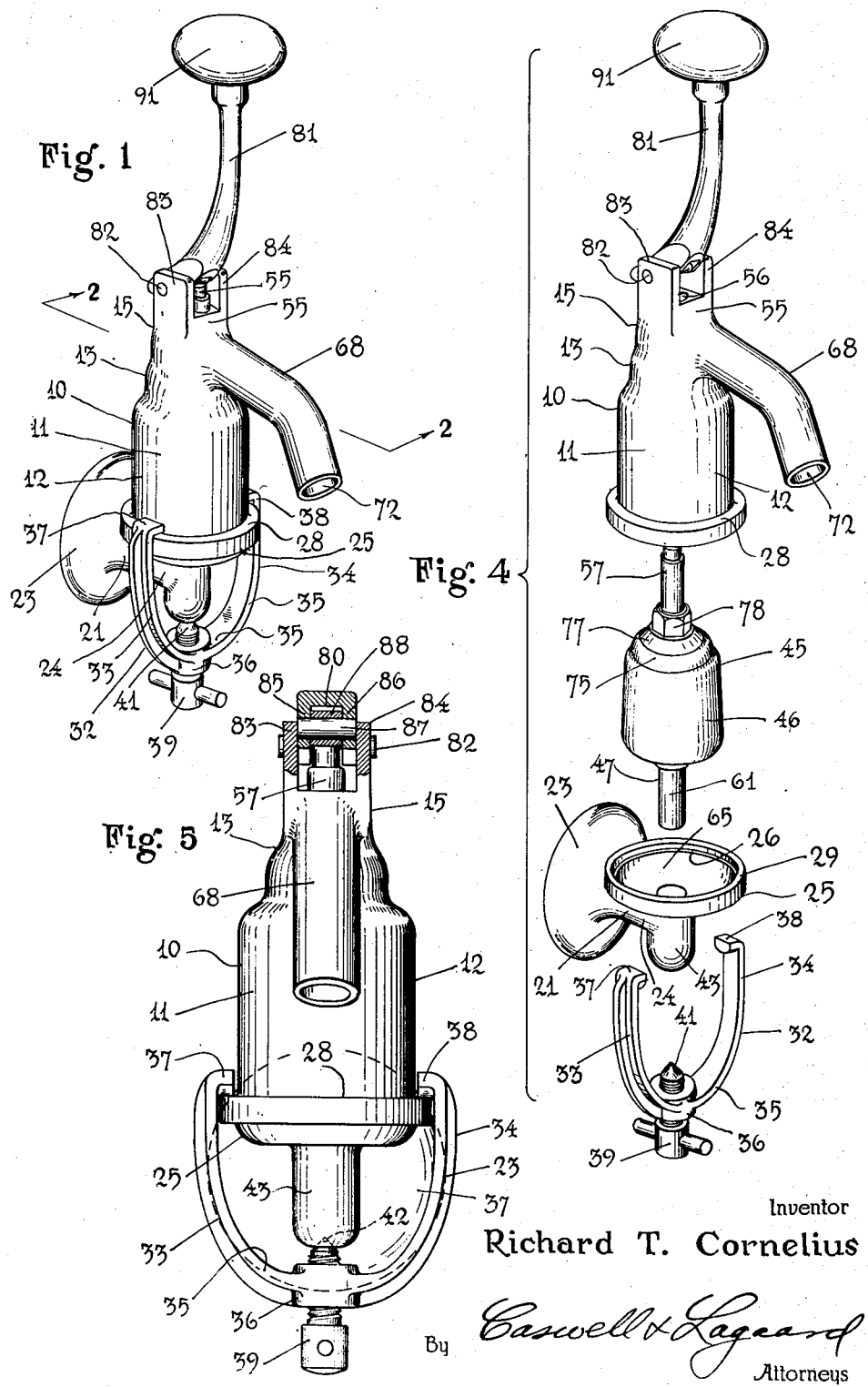

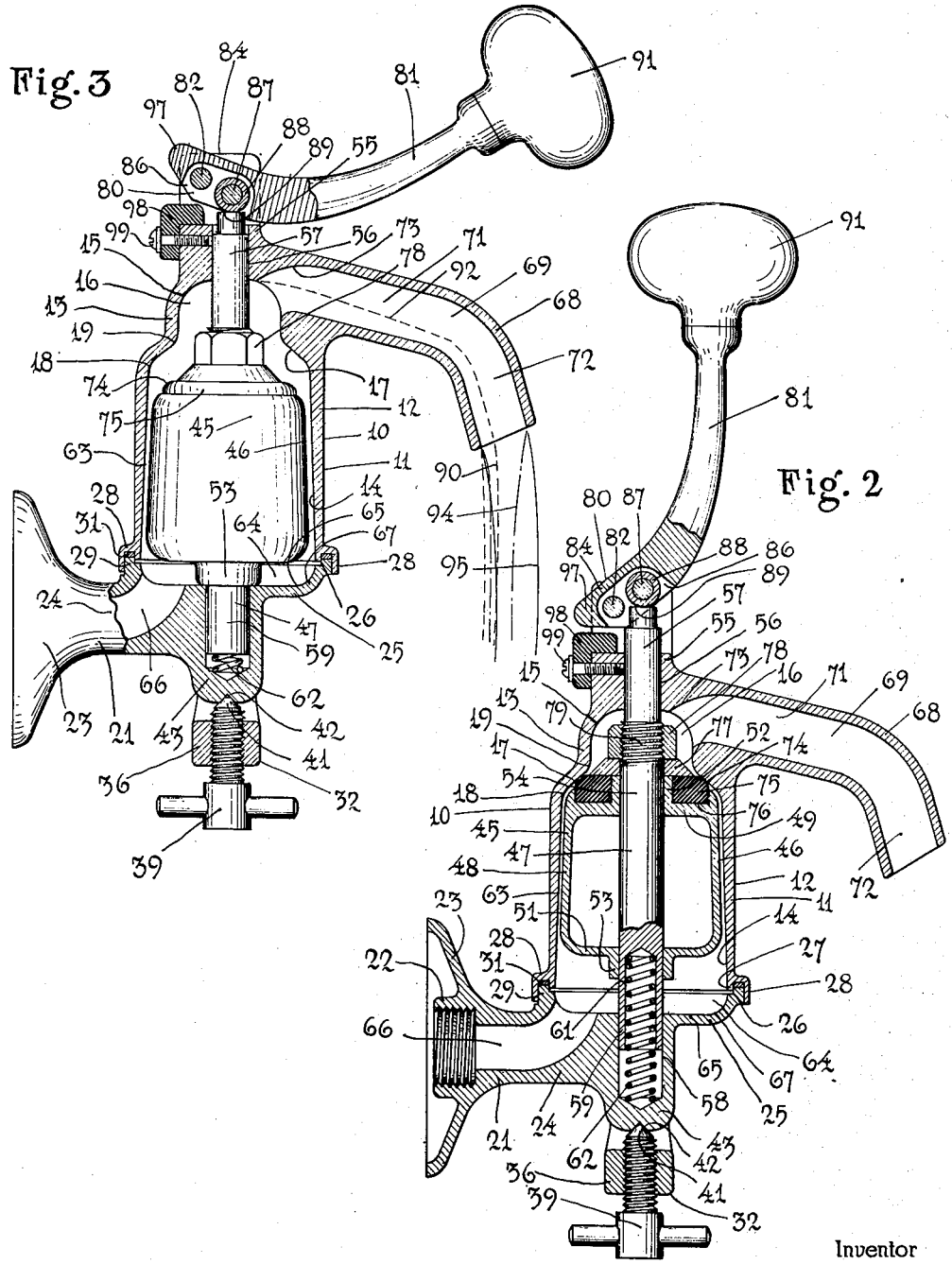

2,081,000

UNITED STATES PATENT OFFICE 2,081,000

BEER FAUCET

Richard T. Cornelius, Minneapolis, Minn.

Application October 23, 1935, Serial No. 46,306

10 Claims. (Cl. 225—6)

My invention relates to beer faucets and has for an object to provide a faucet by means of which beer may be drawn without foaming with relatively high pressures within the beer container.

Another object of the invention resides in providing a beer faucet in which the rate of flow of the beer may be regulated and in which minimum foaming occurs at all rates of flow.

A still further object of the invention resides in providing a beer faucet in which both a shut-off valve and a device for reducing pressure of the beer are contained.

A feature of the invention resides in providing a faucet which may be attached to any existing beer dispensing system without alteration or reconstruction thereof and which will both reduce the pressure and control the flow of beer from the container.

Another object of the invention resides in providing a beer faucet by means of which regulation of the rate of flow of the beer and operation of the shut-off valve is controlled through a single operating member.

An object of the invention resides in constructing the faucet with a body having a vertically extending conical bore therein and in providing a movable member within said bore having a conical surface and forming in conjunction with said bore an annular restricted passageway within said body.

A still further object of the invention resides in providing an outlet chamber at the top of the body communicating with said passageway and an inlet chamber at the lowermost portion of the body, also communicating with said passageway.

A feature of the invention resides in providing a spout, said spout being adapted to communicate with said outlet chamber at the upper portion of the same.

An object of the invention resides in providing said body with a shoulder extending about the bore thereof and in proximity to said outlet chamber and in further providing said movable member with a valve head adapted to engage said shoulder and forming in conjunction therewith a shut-off valve for shutting off the flow of the beer from the faucet.

A still further object of the invention resides in providing a spindle concentrically disposed with reference to and attached to said movable member, and in guiding said spindle for longitudinal movement along said bore, said spindle extending through said outlet chamber and projecting outwardly beyond said body.

Another object of the invention resides in pivoting a lever to said body, said lever engaging the end of said spindle and operating to unseat the valve head from its seat and to reciprocate said movable member along said bore to vary the cross sectional area thereof.

An object of the invention resides in providing a fitting for attachment to the beer pipe and to which said body is attached.

A feature of the invention resides in constructing the body open at the lower end and in constructing the fitting with a shelf upon which the open end of the body is seated.

Another object of the invention resides in constructing the fitting with a guide for receiving the other end of said spindle and in providing a spring within said guide urging said valve head into engagement with the valve seat.

A still further object of the invention resides in providing a clamp for detachably holding said body against said shelf.

A feature of the invention resides in constructing the body with a flange at the lowermost portion thereof and in constructing the clamp with spaced arms having fingers thereon for engagement with said flange, and a connecting portion through which a threaded member is screwed.

Another object of the invention resides in constructing said spindle so that the same may be withdrawn from both of its guides, whereby the entire faucet may be easily taken apart for the purpose of cleaning.

An object of the invention resides in constructing the spout so that all of the air contained within the same is readily discharged from the spout at one time, whereby a clear stream of beer may be drawn from the faucet.

A feature of the invention resides in constructing the passageway through the faucet with rounded corners and fillets and in constructing the outlet chamber spheroidal so as to prevent agitation of the beer in its passage through the faucet to prevent foaming thereof.

Other objects of the invention reside in the novel combination and arrangement of parts and in the details of construction hereinafter illustrated and/or described.

In the drawings:

Fig. 1 is a perspective view of a beer faucet illustrating an embodiment of my invention.

Fig. 2 is an elevational sectional view taken on line 2—2 of Fig. 1.

Fig. 3 is a view similar to Fig. 2 showing the parts in altered position.

Fig. 4 is a perspective view of the various parts of the invention detached from one another.

Fig. 5 is a front elevational view of the invention with a portion thereof shown in section.

My invention has been designed to overcome a number of difficulties inherent with the ordinary beer dispensing systems. Beer as it leaves the brewery in kegs is charged with carbon dioxide gas to an extent of about two and one-half volumes of gas to one of beer. The pressure required to maintain this gas within the beer depends upon its temperature, higher temperatures requiring higher pressures to maintain the original percentage of carbonation. Any reduction of pressure below that necessary to maintain the original percentage of carbonation in the beer will result in reduction in carbonation of the beer, the extent of this reduction depending upon the amount of exposed surface relative to the volume of beer, the length of time the beer stands at reduced pressure and the degree of agitation that the beer receives. If the gas leaves the beer slowly, as when standing in a still barrel, there will be no foam produced in the barrel, but the beer will become what is commonly described as "flat". If the beer is agitated at the same time that the pressure is reduced, such as when it flows from a faucet into a glass, the carbon dioxide will leave the beer fast enough to form bubbles resulting in foam. A certain amount of this foam is desirable and produces what is described as the "collar" to the beer. If the beer flows from the faucet at too high a velocity it will be agitated as it strikes the glass to such an extent that too much foam will result. Such beer is commonly described as "wild". Beer faucets of the common type can be used only in the closed or fully open position–as any attempt to reduce the rate of flow by partially closing the faucet results in extreme agitation within the faucet itself and a consequent formation of excess foam. Because of this fact, the rate of flow must be determined by the pressure at the faucet. Many beer dispensing installations have so little frictional resistance within the piping that it is hence necessary to use very low pressures on the kegs to produce the desired flow at the faucet. This causes the beer in the keg to become "flat" after standing a short time. With such systems a new keg of beer having a high initial pressure in the barrel will be "wild" at the faucet until the pressure is reduced by drawing off the beer.

In the drawing of beer from a faucet, it is highly desirable to prevent excess foaming of the beer and to procure a clear stream of beer. A clear stream of beer in addition to preventing foaming has an attractive appearance to the person served. The present invention provides a faucet which overcomes the objections found with the ordinary systems which at the same time produces a clear stream of beer of any desired volume within the limits of the faucet.

Inasmuch as the present invention may be used with any beer dispensing system and since such systems are well known in the art, the particular manner of installing the invention has not been shown in the drawings. It can readily be comprehended, however, that the device is connected to the beer line at the usual locality and takes the place of the faucet ordinarily used for dispensing the beer. Inasmuch as the invention will operate at practically any pressure, applicant has not thought it necessary to describe any of the systems for procuring pressure in the beer keg, though it can be readily comprehended that any of the usual pump systems or systems using either air or carbon dioxide may be used for the purpose and the pressure raised sufficiently to preserve the original state of the beer and to procure the proper flow of the beer.

My invention comprises a body which I have indicated in its entirety by the reference numeral 10 which contains the moving parts of the invention. This body consists of a body member 11 constructed with a circumferentially extending wall 12 and an end wall 13 connected thereto. Wall 12 is provided with a conical bore 14 while the wall 13 has a spheroidal surface 15 forming a cavity 16 within the same, serving as an outlet chamber. The spheroidal surface 15 is of lesser diameter than the minimum diameter of the bore 14. Between the surface 15 and the bore 14 is provided a shoulder 17 which tapers toward the chamber 16 and which serves as a valve seat in a manner to be presently described in detail. A curved fillet 18 connects the shoulder 17 with the bore 14 while a rounded corner 19 connects the said shoulder 17 with the surface 15. These rounded corners serve in a manner to prevent agitation of the beer in its passage through the faucet and assist in preventing foaming at the discharge end of the faucet. The body member 11 is open at the end thereof opposite the end 13 and is adapted to be closed in the following manner:

A fitting 21 is utilized for supporting the body 10 which is constructed with a threaded nipple 22 adapted to be screwed upon the end of the beer pipe or other fitting or fixture to which the beer faucet is to be attached. This nipple is encircled by a flange 23 which fits up against the fixture from which the beer pipe issues. Fitting 21 is constructed with a neck 24 which has attached to it a circular shelf 25. The body member 11 is adapted to rest upon the shelf 25 which serves as a cap for closing the open end of the same. Shelf 25 is formed with a recess 26 in which a lip 27 on the lowermost end of the wall 12 of body member 11 is received. A channeled flange 28 extends outwardly from the lowermost portion of the body member 11 and encircles a rim 29 at the edge of the shelf 25. A gasket 31 disposed between said flange and rim forms a tight connection between the body and the cap. The use of the lip 27 and the particular construction of the flange 28 and rim 29 causes the body member 11 to become accurately centered with respect to shelf or cap 25 when the said body member is applied to the same.

The body 10 is held detachably mounted upon the shelf 25 by means of a clamp indicated in its entirety by the reference numeral 32. This clamp is best shown in Figs. 4 and 5 and is U-shaped in form having two spaced parallel arms 33 and 34. These arms are connected together by means of a connecting portion 35 which is formed with a boss 36 at the center of the same. The extreme ends of the arms 33 and 34 are provided with fingers 37 and 38 which project inwardly therefrom and extend toward one another. The arms 33 and 34 are spaced apart a distance sufficiently to permit the said clamp to straddle the flange 28 of body member 11 and the fingers 37 and 38 are of such dimensions as to engage the said flange upon the upper surface thereof. The boss 36 is threaded to receive a thumb screw 39 which is formed at its free end with a conical point 41. This point is adapted to engage into a conical depression 42 formed in a boss 43 on the underside of the shelf 25, said depression being concentric with the rim 29 of said shelf. It can be readily comprehended that the body 10 may be easily and quickly attached to the shelf 25 by merely applying the clamp 32 to the same and tightening the thumb screw 39. The parts may be equally as readily disassembled by merely removing the said clamp and lifting the body upwardly.

Within the body member 11 is a conical head or member 45 which is constructed upon the exterior thereof with a conical surface 46 of slightly lesser dimensions than the bore 14, but with the same degree of taper. This member is concentrically disposed within said bore and is mounted upon a spindle 47. The member 45 is constructed hollow having a circumferential wall 48 and end walls 49 and 51 connected thereto. End walls 49 and 51 are provided with bosses 52 and 53 which are concentric with the surface 46 of said member. These bosses are drilled to receive the intermediate portion 54 of spindle 47 which is of suitable dimensions to permit of pressing the same into said bosses to provide a forced fit therebetween, whereby the member 45 is held securely mounted upon said spindle. The end wall 13 of body 12 is provided at its center with a boss 55 concentric with the bore 14. This boss is bored at 56 to provide a guideway in which one end 57 of spindle 47 which projects outwardly beyond the member 45 is guided for reciprocating movement. Boss 43 previously referred to is similarly constructed with a bore 58 which forms a guideway for the other end 59 of said spindle. By means of these two guides the member 45 is accurately guided for longitudinal reciprocating movement within the bore 14. The end 59 of spindle 47 is drilled as designated at 61 to provide a space for the reception of a compression-coil spring 62 which is seated at one end against said spindle and at its other end against the end of boss 43. This spring urges the member 45 upwardly and serves to close the shut off valve of the invention which will be presently described in detail.

The member 45 within the bore 14 of body 10 forms in conjunction therewith an annular passageway 63 between the surface 46 of said member and the bore 14 of the body member 11. This passageway communicates with the chamber 16 previously referred to. Member 45 is considerably shorter than the bore 14 of body member 11 so that another chamber 64 is formed at the end 51 of said member opposite the chamber 16. This chamber is partly formed within the body member 11 and partly within the shelf 25 which is constructed for the purpose with a dished surface indicated at 65. Fitting 21 is provided with a curved passageway 66 which leads from the beer pipe to which the fitting is attached to the chamber 64. It will be noted that the passageway 66 is curved so as to prevent agitation of the beer in its passage from the beer pipe into the chamber 64. Likewise chamber 64 is constructed with a fillet 67 between bore 14 and surface 65, which prevents agitation of the beer in its entry into passageway 63.

To the body 10 of the invention is connected a spout 68 which is disposed at the uppermost portion of said body. This spout is provided with a passageway 69 which has a gradually downwardly sloping branch 71 and a depending branch 72 connected therewith. The inner end 73 of passageway 69 extends upwardly to meet branch 71. The passageway 69 as will be observed, is connected to the chamber 16 at the upper portion of the same.

Although it would be possible to move the member 45 into bore 14 until the passageway 63 were completely closed and thereby shut off the flow of beer from the tap, yet if this were attempted it would require considerable force to dislodge the member 45 from within the bore 14 due to the wedge action which would be procured through the taper of the bore and the said member. In actual construction the taper is very slight and consequently considerable wedge action results. To eliminate the necessity of shutting off the flow by means of closing the passageway 63, I have provided a shut-off valve indicated in its entirety by the reference numeral 74 which is best shown in Fig. 2. The shoulder 17 of body member 11, previously referred to, forms the valve seat of this valve and a valve head 75 carried by the member 45 engages this seat and forms the complemental valve member. This valve head may be constructed of relatively hard rubber or from any other suitable material such as is now used in the construction of valves. The valve head 75 is annular in form and is received within a groove 76 formed in the end wall 49 of member 45. The said valve head is held in position by means of a beveled washer 77 which encircles the end 57 of spindle 47 and which is held against said valve head by means of a nut 78 screwed upon threads 79 formed on the portion 54 of said spindle 47 adjacent the end wall 49. The head 75 is of relatively large diameter, being almost equal in diameter to the minimum diameter of the surface 46 of member 45 and the shoulder 17 is relatively short. This is for the purpose of causing little or no deflection of the beer from its course through the passageway 63 to the outlet chamber 16. The most critical part of the passageway is where the beer leaves the passageway 63 and enters into chamber 16. By constructing the said valve head large, agitation of the beer in flowing from passageway 63 and into chamber 16 is greatly reduced so that a clear stream of beer can be drawn from the faucet.

For operating the member 45 and valve 74, a lever 81 is employed. This lever is pivoted through a pintle 82 to two spaced uprights 83 and 84 extending upwardly from the boss 55. Pintle 82 extends jointly through both of said uprights and said lever. The end of the lever containing said pintle is constructed with a recess 80 which forms the lever at such locality with two spaced walls 85 and 86. The pintle 82 extends through these walls. In addition to this pintle another pintle 87 is provided which extends through the walls 85 and 86 but which lies flush with the outer surfaces of said walls and which is disposed between the uprights 83 and 84 and is held in position thereby. On the pintle 87 is mounted a roller 88 which is adapted to engage the extreme end 89 of the projecting portion 57 of spindle 47. This roller serves to reciprocate the said spindle longitudinally along guides 56 and 59 in opposition to the action of spring 62. Pressure against the end 89 of spindle 47 causes the valve 74 to open and the space 63 to become larger as movement of the lever continues. Release of pressure upon said lever causes the member and valve to operate in reverse manner through the action of spring 62. A knob 91 at the end of said lever permits of easily and conveniently manipulating the same.

For the purpose of limiting the rearward movement of lever 81, said lever is provided with an extension 97 which is adapted to engage a rubber bumper 98 angular in cross section. This bumper extends in between the uprights 83 and 84 and is held in place by means of a screw 99 screwed into the boss 55 of body 10.

Where reduction of pressure has been attempted in other beer dispensing systems considerable difficulty has been encountered in cleaning the systems. By means of the construction herein disclosed, the entire device may be readily disassembled. This is procured by unloosening the thumb screw 39. This permits of removing clamp 32 and of raising the body 12 upwardly. The projecting portion 57 of spindle 47 is so constructed that the same may be withdrawn from guideway 56 and likewise the end 59 of said spindle may also be withdrawn from guideway 58. Due to the fact that transfer of movement from lever 81 to spindle 47 is procured through contact between roller 88 and the end 49 of said spindle, the member 45 is easily withdrawn and disengagement from its two guides procured as illustrated in Fig. 4. The parts when so disassembled are completely accessible and may be readily inspected and cleaned by the ordinary methods. Both the surface 46 of member 45 and the bore 14 of the member 11 are fully exposed and readily accessible. The remaining portion of the system may be cleaned in the customary manner by any of the methods now used for the purpose. To facilitate such cleaning a fitting may be used to take the place of the body 10 which is adapted to be applied to the shelf 25 and held attached to it by means of the clamp 32, the same as said body. This fitting will have attached to it the apparatus by means of which cleaning or scouring is procured in the customary manner.

The method of using my invention is as follows: The ordinary beer faucet on any existing beer dispensing system is merely removed and my improved device substituted in place thereof. The pressure in the system may thereafter be maintained at any pressure up to thirty or forty pounds per square inch, if desired. If wooden kegs are used for the storage of beer, pressures of not over twenty-five pounds per square inch are recommended, due to the inherent weakness of wooden kegs as compared to steel drums or barrels. After the faucet has been properly connected to the system, it is merely necessary to manipulate lever 81 to procure the desired result. A slight movement of said lever downwardly opens the valve 74 fully and maintains a relatively close spacing of the surface 46 of the member 45 with respect to the bore 14 of body member 11. This regulates the flow of beer so that a relatively slow rate of flow results. In Fig. 3, I have shown in dotted lines at 92 the position of the level of the beer in the faucet when the flow is substantially a minimum. Due to the vertical disposition of the annular passageway and the arrangement of the outlet chamber at the upper portion thereof, the air trapped within the chamber 16 is readily expelled. It will be noted that the beer within the spout 68 only partly fills the said spout and air is contained within the remainder thereof. However, by means of the particular construction of the spout, the stream of beer leaving the spout which is indicated at 90 is solid and clear. When the lever 81 is further depressed the stream 97 increases in dimensions still flowing solid and clear. At a certain critical position of the member 45 the air in spout 68 is completely expelled and the stream takes the shape shown at 94. This is brought about by the upward flow of beer into passageway 69 through the portion 73 thereof. In such case the stream is solid throughout the entire system and no air whatsoever is lodged within the faucet. Further opening of the faucet to the fully open position shown in full lines in Fig. 3 produces a stream of the form indicated at 95. After the faucet is closed the stream leaving the spout 68 reduces in dimensions going back to that indicated at 94 and finally to that indicated at 90. However, when the stream is that indicated at 90 no air is permitted to enter the spout and the beer completely fills the entire spout so that only when the shut off valve 74 is completely shut off will the remaining beer within the faucet escape and allow air to reenter the spout 68. It will thus be seen that a solid clear stream of beer can be drawn at any setting of the lever 81 and that any desired volume within the range of the faucet may be procured. In the discharge of the beer into the vessels foaming can be procured by allowing the beer to discharge directly into the center of the vessel when the same is partly or nearly filled. If a clear beer is desired, the same is discharged along the side of the vessel so as to produce a minimum amount of agitation.

My invention is highly meritorious in that an extremely simple and practical device is provided whereby beer may be drawn without the excessive foaming occasioned with the systems now in common use for the purpose. With my invention a minimum amount of beer is trapped in the faucet. When the device is operated the air trapped within the system is readily expelled and a solid clear stream of beer flows from the faucet. In systems utilizing my invention any suitable pressure may be used, thereby adapting the faucet for use in systems where the ordinary beer faucet could not be used. My improved beer faucet can be easily cleaned and is readily taken apart for such purpose so that with proper care the faucet will last indefinitely. The valve head used with my invention may be readily replaced when the occasion demands and is constructed so that the same can be furnished at a trivial cost. By constructing the spout in the manner shown, a uniform solid stream of beer leaves the spout which is attractive in appearance and which prevents agitation of the beer and excessive foaming thereof. The installation of the faucet in beer systems does not require any change or alteration of the system and permits of appreciably increasing the pressure in the beer container. By changing the rate of flow into the drinking vessel and by holding the drinking vessel in different positions, it is possible to secure a different degree of agitation within the vessel and to secure any percentage of foam and clear beer from all foam to all clear. The "wild" beer due to high pressure is etirely eliminated by my invention.

Changes in the specific form of my invention, as herein disclosed, may be made within the scope of what is claimed without departing from the spirit of my invention.

Having described my invention, what I claim as new and desire to protect by Letters Patent is:

1. A beer faucet comprising a body having a conical bore therein and terminating at one end in a spheroidal chamber, a member within said bore having a conical surface concentric with said bore to form an annular passageway therebetween communicating with said chamber, means for guiding said member for longitudinal movement within said bore, said chamber being of a lesser diameter than said bore, a beveled shoulder at the end of said bore having the chamber, said shoulder serving as a valve seat, a fillet between said shoulder and bore, a rounded corner between said shoulder and the surface forming said chamber, a valve head carried by said member, and adapted to engage said valve seat, a spout communicating with said chamber, and means forming an inlet chamber at the other end of said bore.

2. A beer faucet comprising a member having a conical bore and formed at one end of the bore with a shoulder extending inwardly therefrom, a member having a conical surface and disposed within said bore in spaced relation thereto to form an annular passageway therebetween, means for guiding said last named member for longitudinal movement within said bore, an annular valve head carried by said second named member, said head having a diameter substantially equal to that of said bore and engaging said shoulder in proximity to said bore, means forming an outlet chamber communicating with said bore at the end thereof having the shoulder, a spout communicating with said outlet chamber, and means forming an inlet chamber at the other end of said bore.

3. A beer faucet comprising a fitting for attachment to the outlet pipe of a beer dispensing system, a shelf formed on said fitting, a tubular body open at its lower end and resting at its open end upon said shelf, means within said body forming a restricted passageway through said body, a spout communicating with said passageway, and a clamp for detachably holding said body mounted on said shelf.

4. A beer faucet comprising a fitting for attachment to the outlet pipe of a beer dispensing system, a shelf formed on said fitting, a tubular body open at its lower end and resting at its open end upon said shelf, said body having a conical bore therein tapering upwardly, a member having a conical surface disposed within said bore and forming in conjunction with said body an annular passageway therebetween, an inlet chamber at the lower end of said passageway communicating therewith, and an outlet chamber at the upper end of said passageway communicating therewith, a spout at the upper portion of said body communicating with said outlet passageway, and a clamp for detachably holding said body mounted on said fitting.

5. A beer faucet comprising a fitting for attachment to the outlet pipe of a beer dispensing system, a shelf formed on said fitting, a tubular body open at its lower end and resting at its open end upon said shelf, means within said body forming a restricted passageway through said body, a spout communicating with said passageway, a flange extending outwardly from the lower edge of said body, a boss on the underside of said shelf concentrically disposed with respect to said body, a U-shaped clamp having two arms straddling said shelf and a connecting portion disposed below said shelf, fingers on the ends of said arms engaging said flange, and a screw threaded into said connecting portion and engaging said boss.

6. A beer faucet comprising a support, a body having a conical bore open at its larger end and resting at its open end upon said support, a conical member within said body, said member forming in conjunction with said body an annular restricted passageway, a guide in said body and a guide in said support, said guides being concentric with the axis of said bore, a spindle attached to said conical member and guided in said guides, said spindle being withdrawable from both of said guides to free said conical member from said bore, a spout communicating with said passageway, and means for attaching said body to said support.

7. A beer faucet comprising a support, a body having a conical bore open at its larger end and resting at its open end upon said support, a conical member within said body, said member forming in conjunction with said body an annular restricted passageway, a guide in said body and a guide in said support, said guides being concentric with the axis of said bore, a spindle attached to said conical member and guided in said guides, said spindle extending through the upper portion of said body, a valve seat concentric with said bore at its upper end, a valve head carried by said conical member and adapted to engage said seat, a spring for urging said valve head against said seat, a lever pivoted to the upper part of said body and engaging the protruding end of said spindle for moving the valve head off its seat and for moving said conical member within said bore, said spindle being withdrawable from both of said guides to free the conical member from said bore, and a spout communicating with said passageway at the end thereof closed by said valve head.

8. A beer faucet comprising a body having a conical bore open at its larger end, a closure for the open end of said bore, a conical member within said bore concentrically disposed within said bore and forming in conjunction therewith an annular restricted passageway, a spindle attached to said conical member axially thereof, a guide in said body for one end of said spindle, a guide in said closure for the other end of said spindle, said guides being axially disposed relative to said bore, circular parts on said body and closure for bringing said guides into alignment, means for directing beer into one end of said passageway and a spout communicating with the other end of said passageway.

9. A beer faucet comprising a body having a conical bore open at its larger end, a closure for the open end of said bore, a conical member within said bore concentrically disposed within said bore and forming in conjunction therewith an annular restricted passageway, a spindle attached to said conical member axially thereof, a guide in said body for one end of said spindle, a guide in said closure for the other end of said spindle, said guides being axially disposed relative to said bore, circular parts on said body and closure for bringing said guides into alignment, one end of said spindle having a bore therein, a compression coil spring disposed within said bore and seated at the end of the guideway in which the bored end of the spindle is guided, said spring being completely concealed by said bore and guideway and urging said conical member for axial movement in one direction within said body, means for urging said conical member for movement in opposition to said spring, means for directing beer into one end of said passageway and a spout communicating with the other end of said passageway.

10. A beer faucet comprising a body having a conical bore, a constriction in said bore forming a a valve seat, a member within said bore having a conical surface concentric with said bore to form an annular passageway therebetween, a valve member on said first named member adapted to seat against said seat, means for guiding said first named member for longitudinal movement within said bore, to bring said valve member into engagement with said seat, said body having a spheroidal chamber at the end thereof formed with the constriction and separated from said annular passageway by said constriction, a spout communicating with said spheroidal chamber and means for directing beer into the other end of said passageway.

RICHARD T. CORNELIUS.